United States Patent [19]

Goto et al.

[11] Patent Number: 5,277,409
[45] Date of Patent: Jan. 11, 1994

[54] ELASTIC MOUNT HAVING FLUID CHAMBER PARTIALLY DEFINED BY ELASTICALLY SUPPORTED OSCILLATING PLATE

[75] Inventors: Katsuhiro Goto, Komaki; Akiyoshi Ide, Inuyama; Yutaka Ishioka, Nagoya; Rentaro Kato; Tetsu Matsui, both of Kasugai; Ryouji Kanda, Komaki; Muramatsu, Komaki; Keiichi Ishiba, Komaki; Yoshiki Funahashi, Iwakura, all of Japan

[73] Assignee: Tokai Rubber Industries, Ltd., Japan

[21] Appl. No.: 983,765

[22] Filed: Dec. 1, 1992

[30] Foreign Application Priority Data

Dec. 6, 1991 [JP] Japan .................. 3-349584

[51] Int. Cl.$^5$ .............................................. F16M 1/00
[52] U.S. Cl. ................... 267/140.14; 267/149; 267/219; 248/562; 248/636
[58] Field of Search .......... 267/140.11, 140.13, 267/140.14, 140.15, 219, 35, 148, 149; 188/267; 180/300, 312, 902; 248/562, 636

[56] References Cited

U.S. PATENT DOCUMENTS

| 3,321,200 | 5/1967 | Polhemus et al. ............ 267/149 X |
| 3,682,466 | 8/1972 | Huchette et al. ............ 267/149 X |
| 4,693,455 | 9/1987 | Andra ........................... 267/140.3 |
| 4,793,599 | 12/1988 | Ishioka ....................... 267/140.14 |
| 4,869,474 | 9/1989 | Best et al. ................ 267/140.14 X |
| 5,031,884 | 7/1991 | Baudrit et al. ............. 267/140.14 |
| 5,042,786 | 8/1991 | Freudenberg et al. ........ 267/140.14 |
| 5,065,988 | 11/1991 | Wedell ............................ 267/149 |

FOREIGN PATENT DOCUMENTS

| 59-1828 | 1/1984 | Japan . |
| 59-1829 | 1/1984 | Japan . |
| 103045 | 6/1984 | Japan .............. 267/140.14 |
| 60-8540 | 1/1985 | Japan . |
| 3-73741 | 7/1991 | Japan . |

*Primary Examiner*—Robert J. Oberleitner
*Assistant Examiner*—Kevin D. Rutherford
*Attorney, Agent, or Firm*—Parkhurst, Wendel & Rossi

[57] ABSTRACT

A fluid-filled elastic mount wherein an elastic body elastically connecting a first and a second support partially defines a fluid chamber filled with a non-compressible fluid. The elastic mount includes an oscillating plate which partially defines the fluid chamber and which is supported by the second support such that the oscillating plate is displaceable relative to the second support, and an actuator for oscillating the oscillating plate to thereby change a pressure of the fluid in the fluid chamber. The elastic mount further includes an elastic support member for flexibly connecting the oscillating plate to the second support such that the oscillating plate is movable toward and away from the fluid chamber. This elastic support member is formed of an elastic material which substantially permits shearing deformation of the elastic support member and inhibits its compressive and tensile deformation.

8 Claims, 2 Drawing Sheets

ELASTIC MOUNT HAVING FLUID CHAMBER PARTIALLY DEFINED BY ELASTICALLY SUPPORTED OSCILLATING PLATE

BACKGROUND OF THE INVENTION

1. Field of the Invention

The present invention relates generally to a fluid-filled elastic mount used as a vibration damper such as an automobile engine mount, which has a fluid chamber filled with a non-compressible fluid, and more particularly to such a fluid-filled elastic mount wherein the pressure of the fluid in the fluid chamber is suitably regulated to effectively change the damping characteristics of the mount, depending upon the type of the input vibrations received.

2. Discussion of the Prior Art

As a vibration damper for flexibly connecting two members in a vibration system or mounting one of the two members on the other member in a vibration damping fashion, there is known an elastic mount interposed between the two members of the vibration system. The elastic mount has an elastic body interposed between and elastically connecting a first and a second support which are respectively fixed to one and the other of the two members of the vibration system. This type of elastic mount may be used as an engine mount or a suspension bushing for a motor vehicle, for example.

Recently, there have been proposed various types of fluid-filled elastic mounts adapted to exhibit sophisticated damping characteristics, wherein the elastic body which elastically connects the first and second supports partially defines a fluid chamber filled with a non-compressible fluid. Some of these fluid-filled elastic mounts are adapted to electrically control the fluid pressure within the fluid chamber, depending upon the type of the input vibrations received, so that the specific vibrations can be suitably damped or isolated.

Examples of such electrically controllable fluid-filled elastic mount are disclosed in JP-A-60-8540, JP-A-59-1828 and JP-A-59-1829, wherein the fluid chamber is partially defined by an oscillating plate which consists of a magnetic body or a permanent magnet. The oscillating plate is actuated by a solenoid coil, so as to produce pressure pulsation within the fluid chamber to thereby control the fluid pressure within the chamber. Another type of electrically controllable fluid-filled elastic mount is disclosed in Publication No. 3-73741 of unexamined Japanese Utility Model Application, wherein the fluid chamber is partially defined by an oscillating plate fixed to one of an annular permanent magnet and an annular coil which is disposed radially inward or outward of and concentrically with the permanent magnet. The oscillating plate is oscillated by an electromagnetic force produced upon energization of the coil, so as to suitably control the fluid pressure within the fluid chamber.

In the fluid-filled elastic mount of the above type, the oscillating plate must be supported by the second support such that the plate is displaceable relative to the second support. In the known elastic mounts as disclosed in the above publications, therefore, the oscillating plate is supported by the second support with a suitable clearance therebetween, or connected at its outer peripheral portion to the second support through an elastic rubber layer.

In the former case where a suitable clearance is left between the oscillating plate and the second support, the fluid pressure in the fluid chamber tends to be reduced due to the flow of the fluid through the clearance. In the latter case where the elastic rubber layer is interposed between the oscillating plate and the second support, the fluid pressure in the fluid chamber tends to be reduced due to the expansive deformation of the elastic rubber layer. Consequently, the fluid pressure within the fluid chamber cannot be suitably and effectively regulated by the oscillation of the oscillating plate. Thus, the known fluid-filled elastic mount is incapable of exhibiting the intended damping characteristics depending upon the type of the input vibrations received.

SUMMARY OF THE INVENTION

It is therefore an object of the present invention to provide a fluid-filled elastic mount having a first and a second support and an oscillating plate partially defining a fluid chamber, wherein the oscillating plate is displaceably supported by the second support without causing reduction in the fluid pressure within the fluid chamber, to thereby appropriately regulate the fluid pressure in the chamber by oscillation of the oscillating plate, so as to change the vibration damping characteristics of the mount depending upon the type of the input vibrations.

The above object may be achieved according to one aspect of the present invention, which provides a fluid-filled elastic mount comprising: a first and a second support which are spaced apart from each other; an elastic body which is interposed between the first and second supports for elastically connecting the first and second supports and which partially defines a fluid chamber filled with a non-compressible fluid; an oscillating plate which partially defines the fluid chamber and which is supported by the second support such that the oscillating plate is displaceable relative to the second support; an actuator disposed on one of opposite sides of the oscillating plate remote from the fluid chamber, for oscillating the oscillating plate to thereby change a pressure of the fluid in the fluid chamber; and an elastic support member for flexibly connecting the oscillating plate to the second support such that the oscillating plate is movable toward and away from the fluid chamber relative to the second support, the elastic support member being formed of an elastic material which substantially permits shearing deformation of the elastic support member and inhibits compressive or contractive and tensile or expansive deformation of the support member.

In the fluid-filled elastic mount of the present invention constructed as described above, the elastic support member for flexibly connecting the oscillating plate to the second support is formed of a highly elastic material which inhibits the support member from effecting its own tensile deformation. Accordingly, the present engine mount does not suffer from undesirable reduction in the fluid pressure within the fluid chamber resulting from the tensile deformation of the elastic support member. Namely, the fluid pressure in the fluid chamber can be only changed by the oscillation of the oscillating plate and the input vibrations received.

Consequently, the fluid pressure in the fluid chamber can be effectively and stably regulated by the controlled oscillation of the oscillating plate, assuring significantly improved vibration damping characteristics of the elastic mount.

BRIEF DESCRIPTION OF THE DRAWINGS

The above and other objects, features and advantages of the present invention will be better understood by reading the following detailed description of the preferred embodiment of the invention, when considered in connection with the accompanying drawings, in which.

DETAILED DESCRIPTION OF THE PREFERRED EMBODIMENTS

Figure 1:
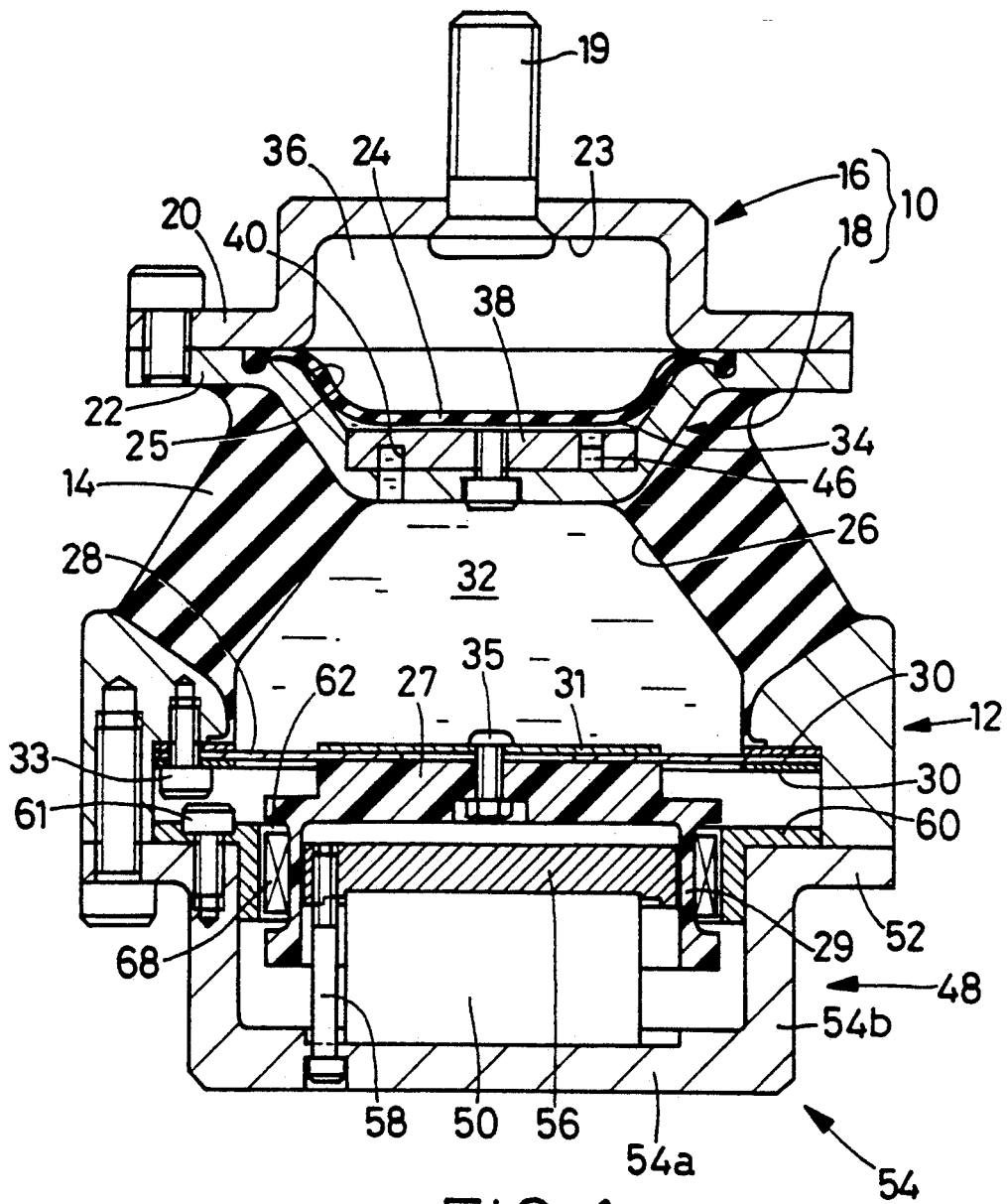
FIG. 1 is an elevational view in axial cross section of one embodiment of a fluid-filled elastic mount of this invention in the form of an engine mount for a motor vehicle.

Referring first to FIG. 1 showing an electrically controllable fluid-filled elastic engine mount for a motor vehicle, reference numerals 10 and 12 denote a first and a second support which are made of metals and are spaced apart from each other by a suitable distance in a load receiving direction in which the engine mount receives input vibrations. These two supports 10, 12 are elastically connected to each other by an elastic body 14 interposed therebetween. The engine mount is used to mount a power unit (including an engine) on the body of the vehicle, in a vibration damping fashion, such that the first and second supports 10, 12 are fixed to one and the other of the power unit and the vehicle body.

The first support 10 consists of an upper member 16 and a lower member 18 which are generally hat-shaped and have respective outward flanges 20, 22. The upper member 16 has a cylindrical portion defining a cylindrical recess 23, and the outward flange 20 extends radially outwardly from the open end of the cylindrical portion. The lower member 18 has a frusto-conical portion defining a frusto-conical recess 25, and the outward flange 22 extends radially outwardly from the open end of the frusto-conical portion. The upper and lower members 16, 18 are butted together at the outward flanges 20, 22 such that the cylindrical and frusto-conical recesses 23, 25 cooperate to define an enclosed space. The two members 16, 18 are bolted together to form the first support 10.

Within the enclosed space 23, 25 of the first support 10, there is disposed a generally frusto-conical flexible diaphragm 24. This diaphragm 24 is fixed with its peripheral portion being gripped by and between the opposed surfaces of the outward flanges 20, 22 of the upper and lower members 16, 18. The enclosed space 23, 25 is divided by the flexible diaphragm 24 into two fluid-tight sections corresponding to the two recesses 23, 25.

On the other hand, the second support 12 is a generally annular member having a relatively large diameter. The second support 12 is spaced by a suitable distance from the lower member 18 of the first support 10, in the axial direction which is parallel to the load receiving direction. The elastic body 14 is interposed between the first and second supports 12, 14 for elastic connection therebetween. This elastic body 14 has a generally frusto-conical shape and a generally frusto-conical bore, and is formed such that it is bonded at its small end to the frusto-conical outer surface of the lower member 18 of the first support 10, and at its large end to the axial end face of the second support 12. Thus, there is prepared an intermediate product consisting of the second support 12, the lower member 18 of the first support 10, and the elastic body 14 formed therebetween.

In the intermediate product 12, 14, 18, the frusto-conical bore of the elastic body 14 is closed at its small end by the bottom wall of the lower member 18. Thus, there is formed a frusto-conical recess 26 which is open at its large end to the bore of the second support 12.

Within the bore of the second support 12 communicating with the frusto-conical recess 26, there is disposed an oscillating plate 27 in the form of a circular disk, such that the oscillating plate 27 is coaxial with the support 12 and is located at the open end of the recess 26. On one of opposite major surfaces of the oscillating plate 27 remote from the recess 26, there is formed as an integral part thereof a cylindrical portion 29 which extends axially outwardly from the outer periphery of the plate 27. This oscillating plate 27 extends in a plane perpendicular to the above-indicated load-receiving direction in which the recess 26 is open, such that its cylindrical portion 29 protrudes in the axial direction away from the recess 26.

An elastic support member in the form of an annular sheet spring 28 is superposed at its radially inner portion on the other major surface of the oscillating plate 27 on the side of the recess 26. Further, a holder disk 31 is superposed on the upper surface of the sheet spring 28 and fixed to the oscillating plate 27 by a bolt 35. Thus, the sheet spring 28 is retained on the other major surface of the oscillating plate 27 indicated above, with its radially inner portion gripped by and between the holder disk 31 and oscillating plate 27, such that the spring 28 extends radially outwardly from the oscillating plate 27.

The sheet spring 28 is also fixedly attached to the second support 12 such that its outer peripheral portion is gripped by and between two annular retainer members 30, and fixed thereto and to the second support 12 by bolts 33. Thus, the oscillating plate 27 is fixed to the sheet spring 28, which is in turn fixed to the second support 12. It will be understood from the foregoing description that in the instant embodiment the sheet spring 28 serves to flexibly connect the oscillating plate 27 to the second support 12.

The sheet spring 28 may be a metallic spring formed of an iron-based material usually employed for springs, or a non-metallic spring formed of highly elastic synthetic resin such as FRP (fiber reinforced plastic). However, the sheet spring 28 should not be selected from an elastic rubber body and other members having a small modulus of elasticity as measured in its expanding and contracting direction. Namely, the material of the sheet spring 28 is substantially limited to those which allow the spring 28 to perform its shearing deformation but inhibit its own contraction and expansion or compressive and tensile deformation.

Accordingly, the sheet spring 28 permits the oscillating plate 27 to be displaced in the axial direction (toward and away from the recess 26) relative to the second support 12, based on the shearing deformation thereof. However, the sheet spring 28 itself is inhibited from effecting tensile or expansive deformation in the direction toward and away from the recess 26 while the oscillating plate 27 is not oscillated by an electromagnetic drive device 48 (which will be described later), and held in a given position with respect to the second support 12.

With the oscillating plate 27 elastically fixed t the second support 12 by the sheet spring 28, the frusto-conical recess 26 is fluid-tightly enclosed to form a fluid chamber in the form of a pressure-receiving chamber 32 filled with a suitable non-compressible fluid, preferably water, alkylene glycol, polyalkylene glycol and silicone oil.

Since the pressure-receiving chamber 32 is partially defined by the wall of the elastic body 14, the pressure of the fluid in the chamber 32 changes due to elastic deformation of the elastic body 14 upon application of a vibrational load between the first and second support 10, 12 in the load receiving direction, i.e., in the axial direction of the engine mount.

The pressure-receiving chamber 32 communicates, through an orifice passage 46, with an equilibrium chamber 34 also filled with the non-compressible fluid. Namely, the equilibrium chamber 34 is defined by the flexible diaphragm 24 and a disk 38 accommodated in the frusto-conical recess 25 of the lower member 18 of the first support 10. The disk 38 is bolted to the bottom wall of the lower member 18, which functions as a partition which separates the pressure-receiving and equilibrium chambers 32, 34. The disk 38 has a circumferential groove 40 in the surface which contacts the bottom wall of the lower member 18. The circumferential groove 40 communicates with the pressure-receiving chamber 32 through a communication hole formed through the bottom wall of the lower member 18, and with the equilibrium chamber 34 through a communication hole formed through the disk 38. Thus, the groove 40 cooperates with the communication holes to define the orifice passage 46 for fluid communication between the two fluid chambers 32, 34.

The flexible diaphragm 24 elastically yields to permit a volumetric change of the equilibrium chamber 34 when the fluid flows into and from the equilibrium chamber 34 upon application of a vibrational load to the engine mount. Thus, the flexible diaphragm 24 absorbs a pressure change in the equilibrium chamber 34. The flexible diaphragm 24 and the upper member 16 of the first support 10 define an air chamber 36, which permits elastic deformation or displacement of the flexible diaphragm 24.

When a pressure change of the fluid occurs in the pressure-receiving chamber 32 due to the input vibration, the fluid is forced to flow through the orifice passage 46, between the two fluid chambers 32, 34, whereby the input vibration is damped based on the resonance of the fluid flowing through the orifice passage 46, as well known in the art. The orifice passage 46 is tuned, that is, the length and cross sectional area of the passage 46 are determined, so as to effectively damp low-frequency vibrations such as shake, based on the resonance of the fluid flowing through the orifice passage 46.

The engine mount is equipped with an actuator in the form of the electromagnetic drive device 48 for actuating the oscillating plate 27 which partially define the pressure-receiving chamber 32. The drive device 48 is disposed on the side of the plate 27 remote from the pressure-receiving chamber 32.

The electromagnetic drive device 48 includes a cylindrical permanent magnet 50 having opposite magnetic poles or pole faces at its axially opposite ends. The permanent magnet 50 is accommodated in a ferromagnetic base member 54 including a bottom wall portion 54a and a cylindrical wall portion 54b, such that the lower pole face of the magnet 50 is in contact with a radially central portion of the bottom wall portion 54a of the base member 54. The base member 54 has an outward flange 52 at one of opposite axial ends of the cylindrical wall portion 54b remote from the bottom wall portion 54a.

A ferromagnetic circular end disk 56 having a relatively large thickness is disposed in contact with the upper pole face of the permanent magnet 50. The end disk 56 has a diameter which is larger than that of the magnet 50 and smaller than the inside diameter of the cylindrical wall of the base member 54. The end disk 56 is forced onto the pole face of the magnet 50, by a plurality of screws 58 which connect the end disk 56 to the base member 54 such that the permanent magnet 50 is tightly gripped by and between the end disk 56 and the base member 54. The screws 58 are screwed into the peripheral portion of the end disk 56, which protrudes radially outwardly from the periphery of the pole face of the magnet 50.

At the open end of the cylindrical wall portion 54b of the ferromagnetic base member 54, there is fixed a ferromagnetic annular member 60 by a plurality of screws 61. This annular member 60 includes a cylindrical portion whose outer circumferential surface is in contact with the inner circumferential surface of the cylindrical wall portion 54b of the base member 54. With the annular member 60 thus attached to the base member 54, there exists a given radial spacing between the inner circumferential surface of the cylindrical portion of the annular member 60 and the opposite outer circumferential surface of the end disk 56.

The base member 54, end disk 56 and annular member 60 are all made of an iron or other ferromagnetic material, so that there is formed a closed magnetic circuit. The end disk 56 and the annular member 60 which partially define the closed magnetic circuit cooperate to define an annular or cylindrical gap 62.

In the present embodiment, the base member 54 and annular member 60 function as a first yoke member connected to the lower pole face of the permanent magnet 50, while the end disk 56 functions as a second yoke member connected to the upper pole face of the magnet 50. These first and second yoke members cooperate with the magnet 50 to provide the closed magnetic circuit. The screws 58 connecting the base member 54 and the end disk 56 are made of a non-magnetic material such as an aluminum alloy, to prevent shorting of the magnetic circuit.

With the outward flange 52 of the base member 54 superposed on the lower axial end of the second support 12 and bolted thereto, the permanent magnet 50 and other components 54, 56, 60 which define the closed magnetic circuit are attached to the mount body (10, 12, 14, 27) of the engine mount. The oscillating plate 27 has a cylindrical portion 29 which extends through the above-indicated annular gap 62 between the end disk 56 and the annular member 60. Further, small clearances are provided between the cylindrical portion 29 of the oscillating plate 27 and the opposed surfaces of the end disk 56 and the annular member 60 which define the gap 62, so that the cylindrical portion 29 is axially movable over a suitable distance relative to the end disk 56 and the base member 54.

Within the annular gap 62 in which the cylindrical portion 29 of the oscillating plate 27 is positioned, there is disposed an annular moving coil 68 which is axially movable within the annular gap 62. The moving coil 68 is secured to the outer circumferential surface of the cylindrical portion 29 of the oscillating plate 27, so that the oscillating plate 27 is moved with the coil 68 when the coil 68 is moved with an electric current applied thereto as described below.

The axial length of the annular moving coil 68 is selected to be smaller than the axial length of the cylindrical portion of the annular member 60 partially defining the annular gap 62, and the coil 68 is located at an axially middle portion of the annular gap 62. Therefore, the coil 68 axially displaced within the gap 62 is always positioned within the axial length of the annular member 60, in order to assure a substantially constant magnetic flux density applied to the coil 68, irrespective of the axial position of the coil 68.

In operation of the engine mount constructed as described above, the moving coil 68 is energized by a controlled alternating current, whereby the coil 68 is subject to an electromagnetic force (Lorentz force) produced according to the Fleming's left-hand rule, so that the coil 68 is moved with the oscillating plate 27. Thus, the oscillating plate 27 is displaced with a force proportional to the amount of electric current applied to the coil 68. The oscillating plate 27 is oscillated by controlling the current applied to the coil 68, depending upon the pressure change in the pressure-receiving chamber 32 due to the input vibrational load. Thus, the fluid pressure in the chamber 32 can be effectively regulated so as to change the damping characteristic of the engine mount, depending upon the type of vibration received.

Described in detail, when the frequency of the input vibration is relatively low, the oscillating plate 27 is oscillated in the same phase as the input vibration, so as to positively cause a fluid pressure change in the pressure-receiving chamber 32, for increasing the amount of the fluid which flows through the orifice passage 46, and thereby improving the damping effect based on the fluid flow through the orifice passage 46. When the frequency of the input vibration is in a medium or low band, the phase of oscillation of the oscillating plate 27 is reversed with respect to that of the input vibration, to thereby absorb the fluid pressure change in the chamber 32 or reduce the amount of the fluid pressure change, so that the engine mount exhibits an effectively reduced dynamic spring constant with respect to the medium to low frequency vibration.

In the present engine mount, in particular, the sheet spring 28 having high elasticity serves to flexibly connect the oscillating plate 27 to the second support 12 such that the plate 27 is displaceable relative to the second support 12. When the oscillating plate 27 is oscillated or when the pressure of the fluid in the pressure-receiving chamber 32 is changed upon application of the vibrations to the mount, therefore, the sheet spring 28 is inhibited from undergoing tensile or expansive deformation due to its high elasticity even with the fluid pressure in the pressure-receiving chamber 32 directly acting on the sheet spring 28.

Consequently, the present engine mount does not suffer from undesirable reduction in the fluid pressure in the pressure-receiving chamber 32 resulting from the tensile deformation of the sheet spring 28, whereby the pressure in the chamber 32 can be efficiently regulated with high accuracy upon oscillation of the oscillating plate 27, assuring excellent and stable damping characteristics of the engine mount.

In the electromagnetic drive device 48 of the present engine mount, the magnetic field to which the moving coil 68 is exposed has a sufficiently high magnetic flux density, with a reduced amount of magnetic flux leakage from the permanent magnet 50, since the magnetic field is produced at the annular gap 62 provided in the closed magnetic circuit or path. Consequently, upon energization of the moving coil 68, a sufficiently large magnetic force is produced to actuate the oscillating plate 27 so as to suitably regulate the fluid pressure in the pressure-receiving chamber 32, and thereby exhibit optimum damping characteristics depending upon the type of the input vibration.

As the magnetic field in which the moving coil 68 is placed is produced at the annular gap 62 in the closed magnetic circuit defined by the components 50, 54, 60, 56, the magnetic flux density in the magnetic field and the magnetic force produced are made uniform throughout the field, irrespective of the axial position of the coil 68 which is axially moved within the gap 62. This arrangement permits the produced magnetic force to be substantially proportional to the amount of electric current to be applied to the moving coil 68, whereby the oscillation of the oscillating plate 27 can be comparatively easily controlled, with an effectively reduced amount of distortion of waveform of the fluid pressure pulsation in the pressure-receiving chamber 32. Thus, the present engine mount is capable of intricately and precisely controlling the fluid pressure within the chamber 32, so as to exhibit improved vibration damping characteristics.

Figure 2:
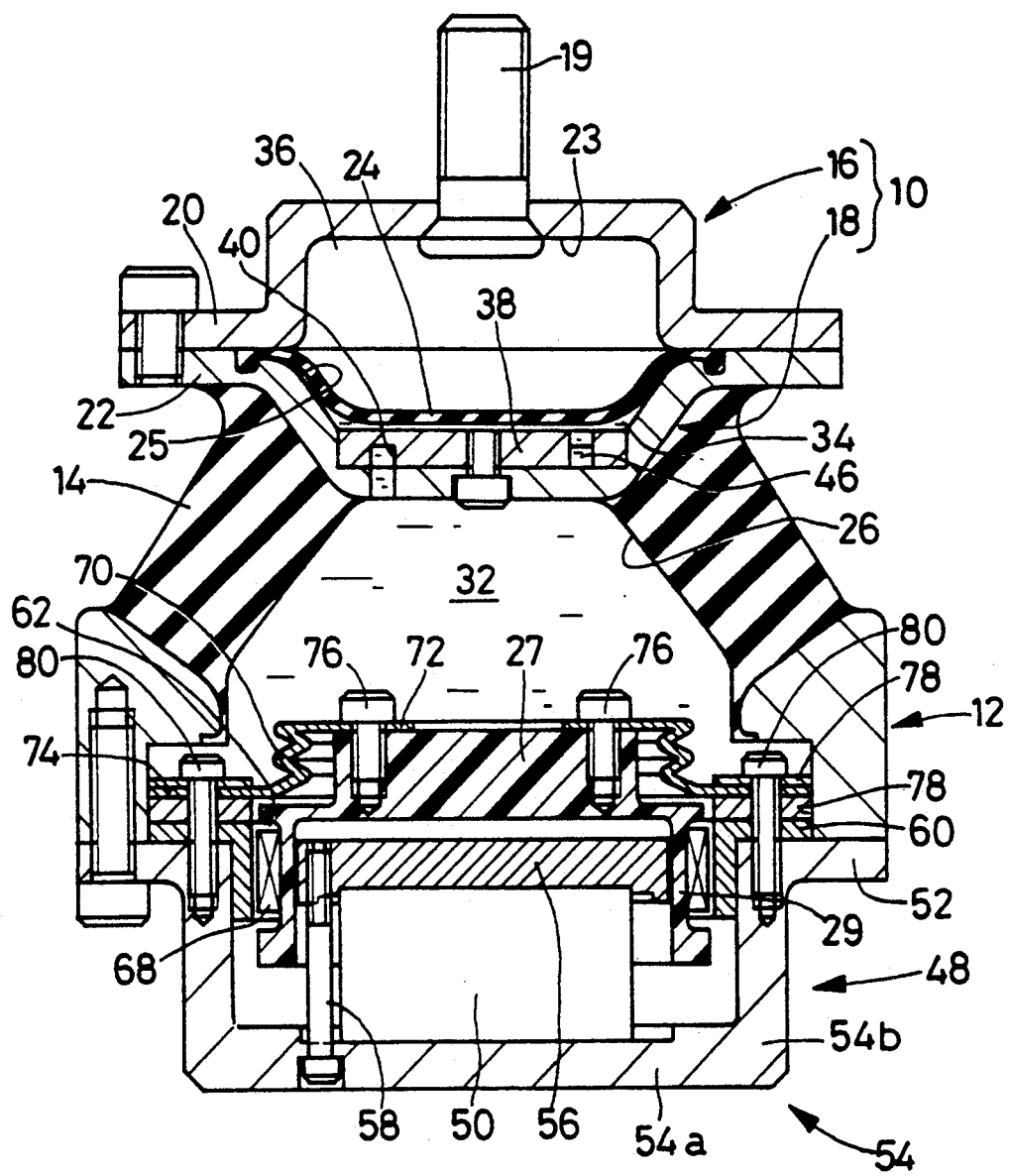
FIG. 2 is an elevational view in axial cross section of another embodiment of the fluid-filled elastic mount of this invention in the form of an engine mount for a motor vehicle.

Referring next to FIG. 2, there will be described another embodiment of this invention also in the form of a vehicle engine mount, which is modified in the elastic support member for flexibly supporting the oscillating plate 27, with respect to the first embodiment of FIG. 1. In the interest of brevity and simplification, the same reference numerals as used in the first embodiment will be used in the second embodiment to identify the corresponding components, and redundant description of these components will not be provided.

The second embodiment employs an annular bellows member 70 as the elastic support member for flexibly connecting the oscillating plate 27 to the second support 12. The bellows member 70 includes a bellows portion in which the oscillating member is substantially received, an inward flange 72 which extends radially inwardly from one of opposite axial ends of the bellows portion 71, and an outward flange 74 which extends radially outwardly from the other axial end of the portion 71. The bellows member 70 is attached to the oscillating plate 27 such that the inward flange 72 is superposed and retained on the upper surface of the plate 27 by means of screws 76. The outward flange 74, which is gripped by and between two annular plates 78, 78, is disposed on the annular member 60 partially defining the closed magnetic circuit, and is fixed to the base member 54 by means of screws 80.

Like the sheet spring 28 used in the first embodiment, the bellows member 70 is formed of a high elastic material which permits the shearing deformation of the bellows member 70 but inhibits its own expansion and compression. For example, the bellows member 70 may be formed from a metallic spring or formed of a highly elastic resin or other suitable material.

In operation of the present engine mount, the bellows portion 71 of the bellows member 70 expands and contracts in the axial direction due to its shearing deformation, so as to permit the oscillating plate 27 to be displaced in the axial direction (toward and away from the recess 26) relative to the second support 12. However, the bellows member 70 itself is inhibited from undergoing expansive and contractive or compressive and tensile deformation or buckling as a result of its own stretching.

Accordingly, the present engine mount using the bellows member 70 as the elastic support member does not suffer from undesirable reduction in the fluid pressure in the pressure-receiving chamber 32 resulting from the tensile deformation of the bellows member 70 per se, whereby the pressure in the chamber 32 can be efficiently regulated with high accuracy upon oscillation of the oscillating plate 27, assuring excellent and stable damping characteristics of the engine mount.

While the present invention has been described in detail in its presently preferred embodiments with a certain degree of particularity, it is to be understood that the invention is not limited to the details of the illustrated embodiments, but may be otherwise embodied.

While the fluid chamber (pressure-receiving chamber 32) is held in communication with the equilibrium chamber 34 through the orifice passage 46 in the illustrated embodiments, the present invention is applicable to a fluid-filled elastic mount which does not have such equilibrium chamber and orifice passage and which damps input vibrations by suitably regulating the fluid pressure in the fluid chamber (32) by the oscillating plate 27.

Further, the construction of the actuator for oscillating the oscillating plate 27 is not limited t that of the electromagnetic drive device 48 of the illustrated embodiments, but may be selected from various other types of known actuators utilizing the electromagnetic force or magnetic force, or a piezoelectric element, for example.

In the illustrated elastic mount, the first and second supports 10, 12 are secured to the opposite ends of the elastic body 14 such that these supports 10, 12 are opposed to each other with a spacing therebetween in the load-receiving direction. However, the present invention may be equally applicable to a so-called cylindrical elastic mount wherein inner and outer sleeves are disposed with a radial spacing therebetween, and are connected to each other by an elastic body interposed therebetween.

While the illustrated fluid-filled elastic mount is an engine mount for a motor vehicle, the principle of the present invention is equally applicable to other types of vehicle damping devices such as vehicle body mounts and differential gear mounts, and even to vibration dampers or elastic mounts used in various equipment or systems other than those for motor vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount comprising:
   a first and a second support which are spaced apart from each other;
   an elastic body which is interposed between said first and second supports for elastically connecting the first and second supports and which partially defines a fluid chamber filled with a non-compressible fluid;
   an oscillating plate which partially defines said fluid chamber and which is supported by said second support such that the oscillating plate is displaceable relative to the second support;
   an actuator disposed on one of opposite sides of said oscillating plate remote from said fluid chamber, for oscillating said oscillating plate to thereby change a pressure of the fluid in said fluid chamber;
   an elastic support member for flexibly connecting said oscillating plate to said second support such that said oscillating plate is movable toward and away from said fluid chamber relative to said second support, said elastic support member consisting of an annular sheet spring being formed on an elastic material which substantially permits shearing deformation of the elastic support member and inhibits compressive and tensile deformation thereof, said annular sheet spring being retained on one of opposite major surfaces of said oscillating plate remote from said actuator such that said sheet spring moves with said oscillating plate, said annular sheet spring having an outer peripheral portion; and
   two annular retainer members for gripping therebetween said outer peripheral portion of said annular sheet spring, said two annular retainer members and said outer peripheral portion of said annular sheet spring being bolted to said second support.

2. A fluid-filled elastic mount according to claim 1, further comprising a holder disk disposed on said annular sheet spring and fixed to said oscillating plate, so as to cooperate with the oscillating plate to sandwich the annular sheet spring therebetween.

3. A fluid-filled elastic mount according to claim 1, wherein said elastic support member consists of an annular bellows member having a bellows portion in which said oscillating plate is substantially received, an inward flange and an outward flange formed at opposite axial ends of said bellows portion, said inward flange being retained on one of opposite major surfaces of said oscillating plate remote from said actuator, said outward flange being fixedly supported by said second support.

4. A fluid-filled elastic mount according to claim 1, wherein said elastic support member is made of an iron-based spring material as said elastic material.

5. A fluid-filled elastic mount according to claim 1, wherein said elastic material is selected from synthetic resins including fiber reinforced plastic.

6. A fluid-filled elastic mount according to claim 1, wherein said actuator comprises:
   a permanent magnet having opposite magnetic pole faces;
   a first and a second yoke member which are connected to said opposite magnetic pole faces of said permanent magnet, respectively, and which cooperate with said permanent magnet to define a closed magnetic circuit, said first and second yoke members defining therebetween an annular gap in said magnetic circuit; and
   an annular moving coil received in said annular gap and fixed to said oscillating plate, said moving coil being displaced in said annular gap in an axial direction thereof, to oscillate said oscillating plate upon energization of said moving coil.

7. A fluid-filled elastic mount according to claim 6, wherein said oscillating plate has a cylindrical portion which protrudes from an outer periphery of the plate away from said fluid chamber, to extend through said annular gap between said first and second yoke member, said annular moving coil being fixed to said cylindrical portion of said oscillating plate.

8. A fluid-filled elastic mount according to claim 1, wherein said fluid chamber is a pressure-receiving chamber, and further comprising a flexible diaphragm which partially defines an equilibrium chamber, and means for defining an orifice passage for fluid communication between said pressure-receiving and equilibrium chambers, said orifice passage being tuned to damp a vibrational load having a frequency within a predetermined range, based on resonance of said non-compressible fluid flowing through said orifice passage upon application of said vibrational load between said first and second supports.

* * * * *